A. T. DAWSON AND G. T. BUCKHAM.
GUN MOUNTING.
APPLICATION FILED JULY 23, 1920
1,371,738.
Patented Mar. 15, 1921.
6 SHEETS—SHEET 1.
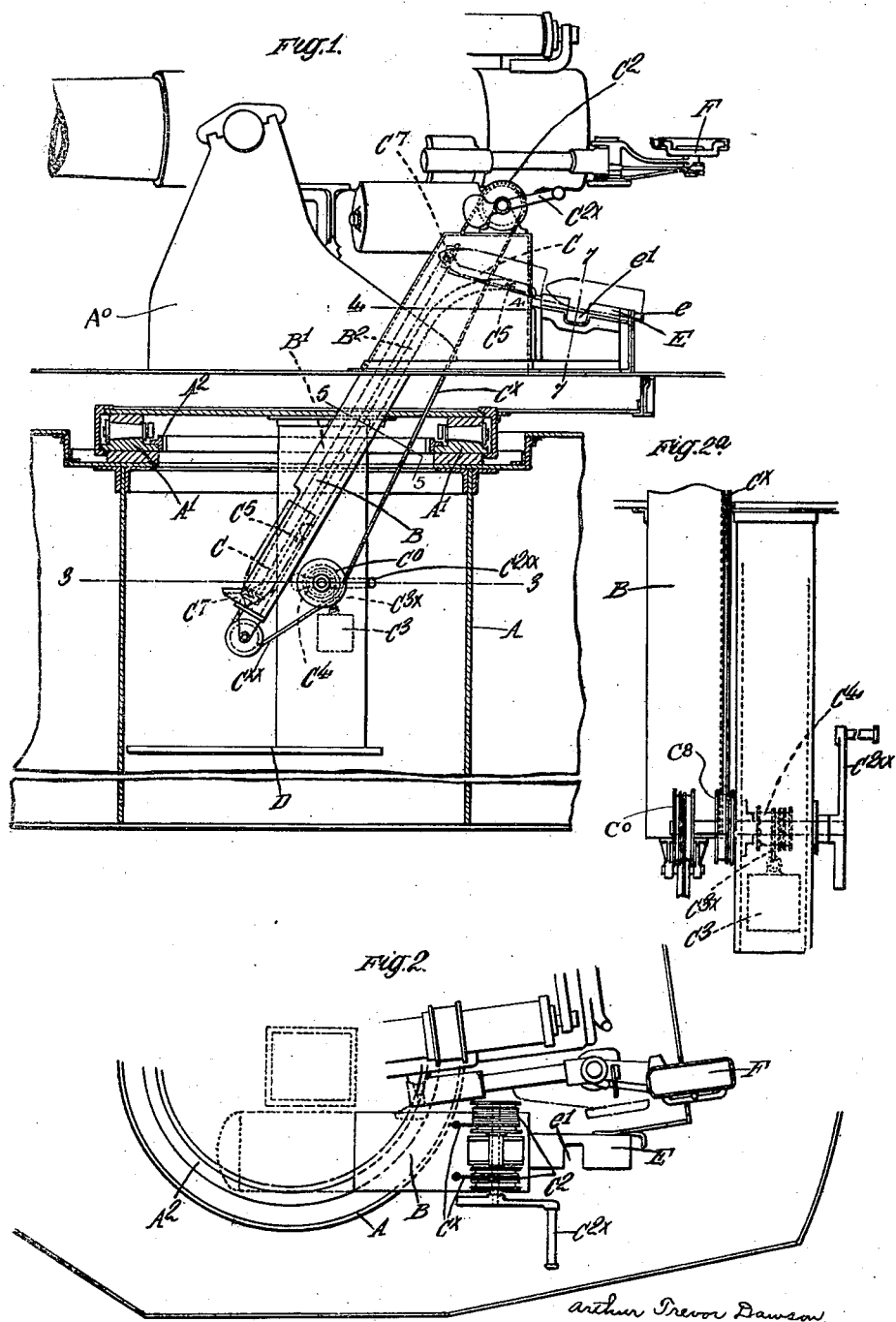

A. T. DAWSON AND G. T. BUCKHAM.
GUN MOUNTING.
APPLICATION FILED JULY 23, 1920.
1,371,738.
Patented Mar. 15, 1921.
6 SHEETS—SHEET 2.
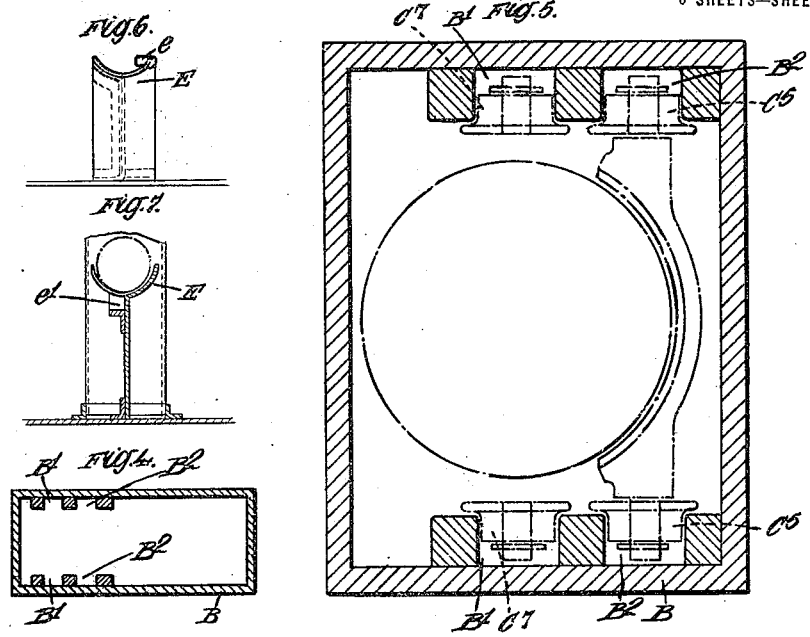
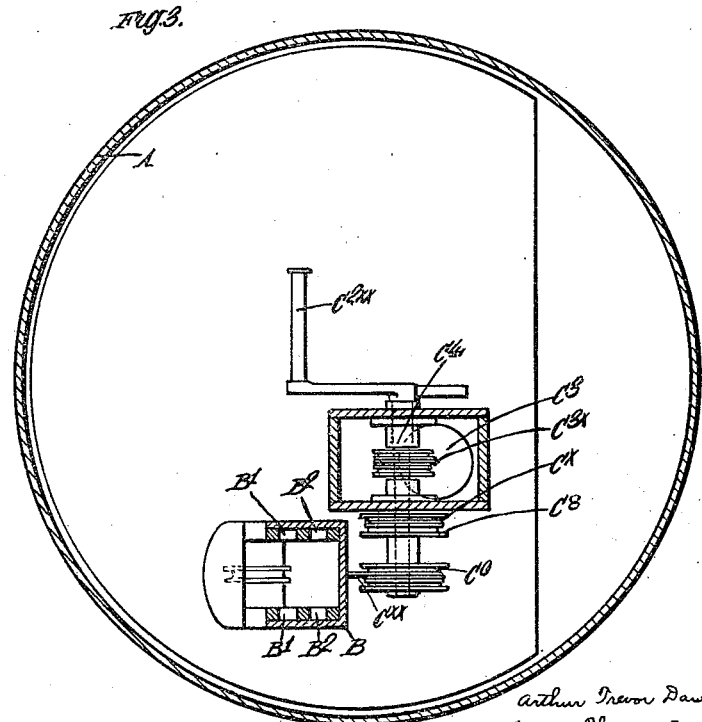

A. T. DAWSON AND G. T. BUCKHAM.
GUN MOUNTING.
APPLICATION FILED JULY 23, 1920.
1,371,738. Patented Mar. 15, 1921.
6 SHEETS—SHEET 3.
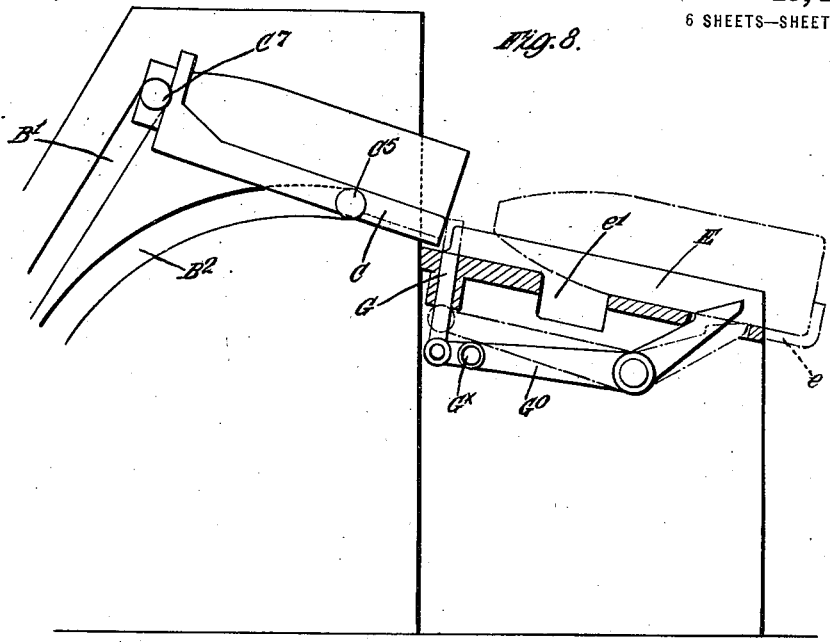
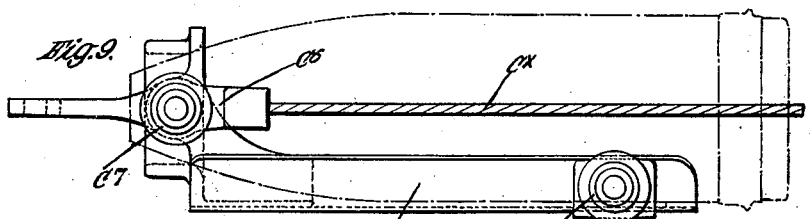
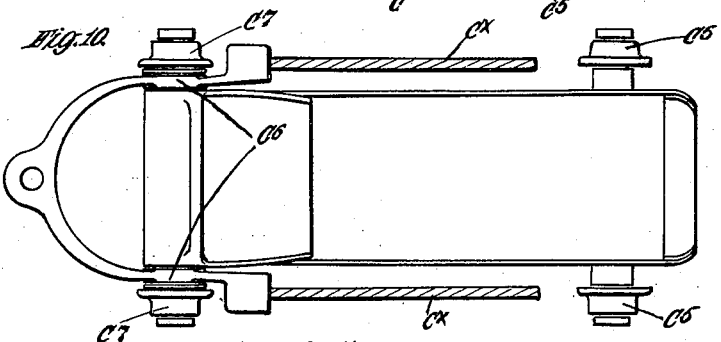
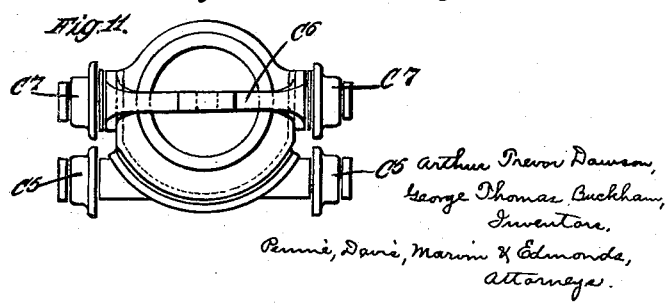
Arthur Trevor Dawson,
George Thomas Buckham,
Inventors.
Pennie, Davis, Marvin & Edmonds,
Attorneys.

A. T. DAWSON AND G. T. BUCKHAM.
GUN MOUNTING.
APPLICATION FILED JULY 23, 1920.
1,371,738.
Patented Mar. 15, 1921.
6 SHEETS—SHEET 4.
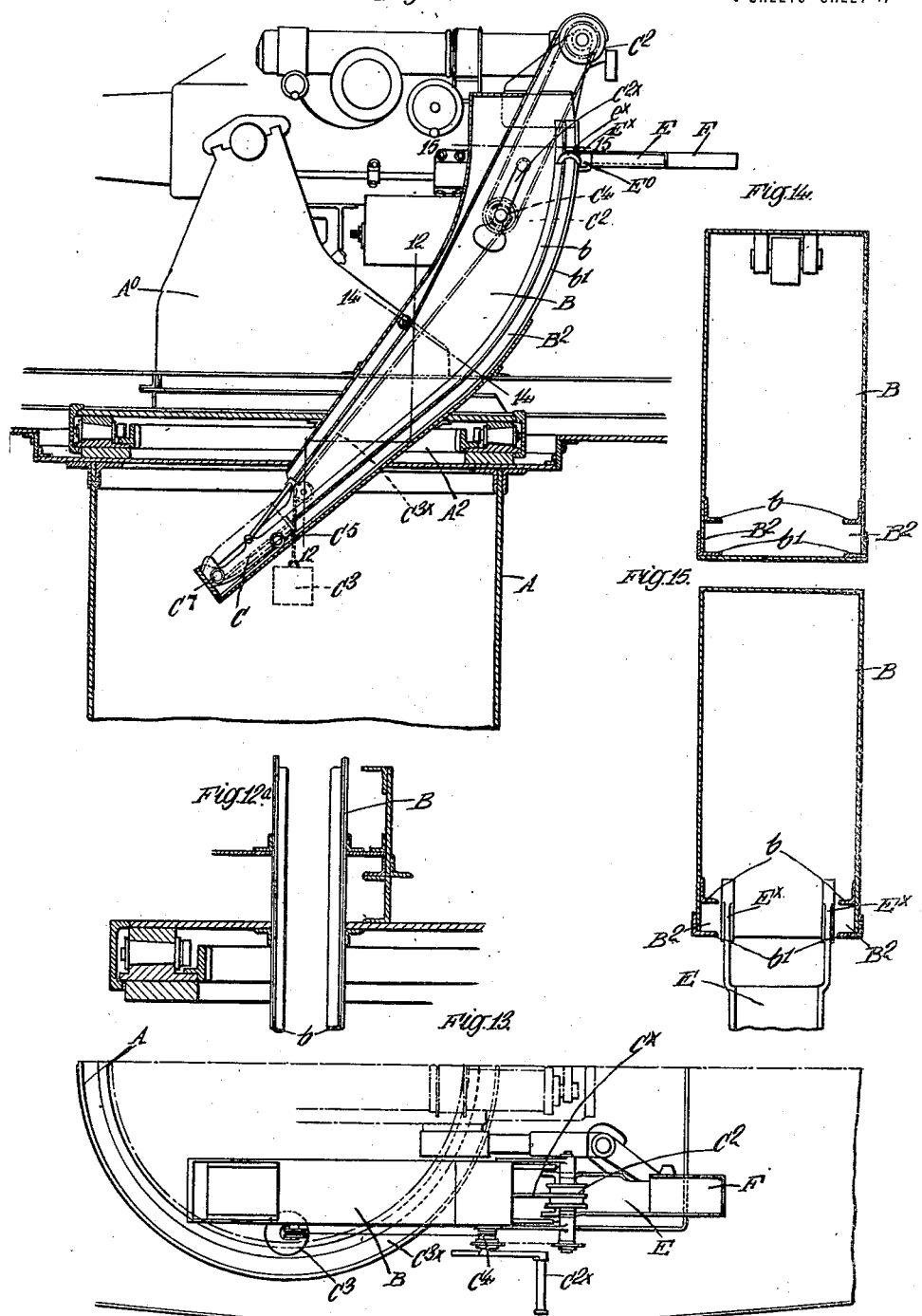

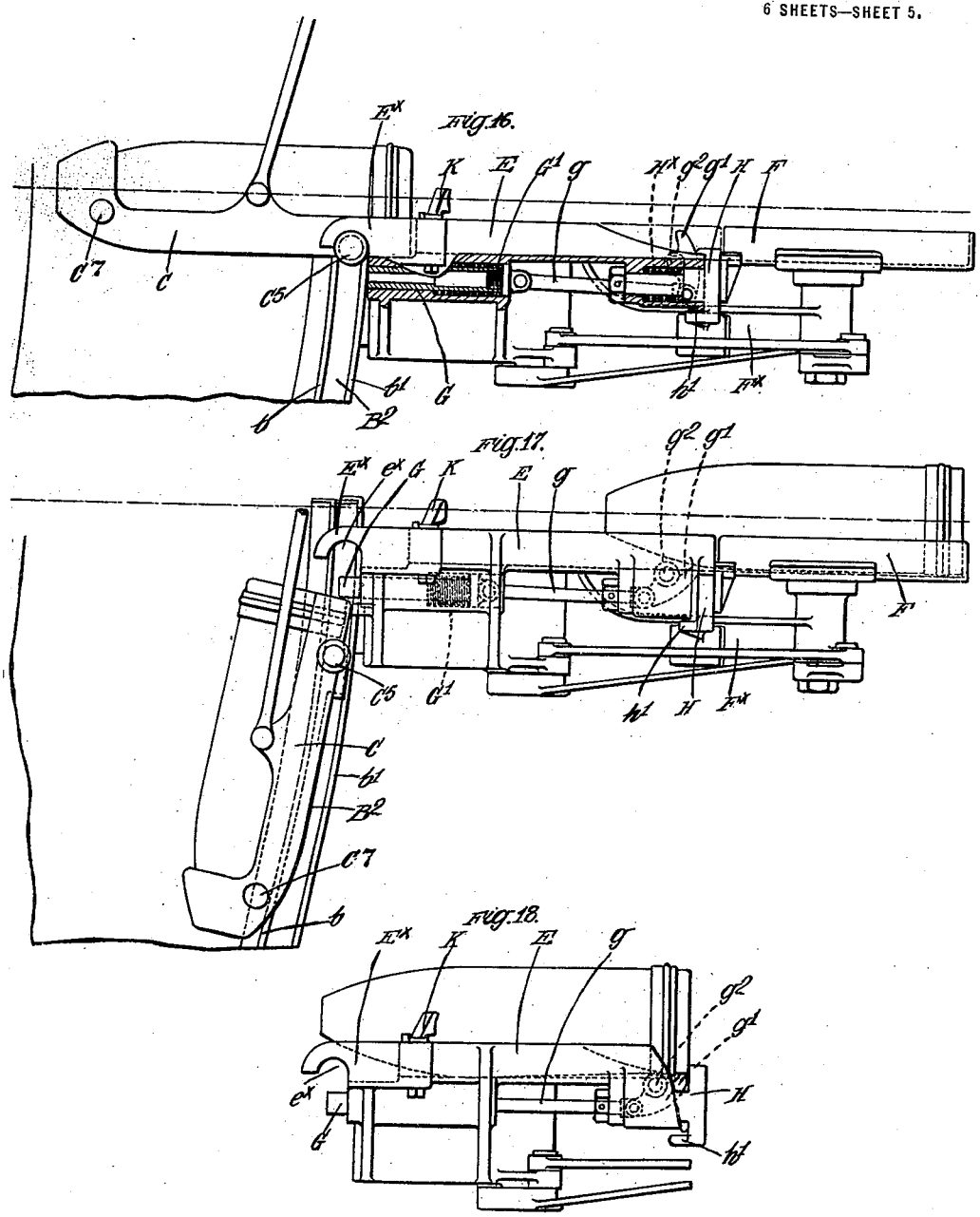

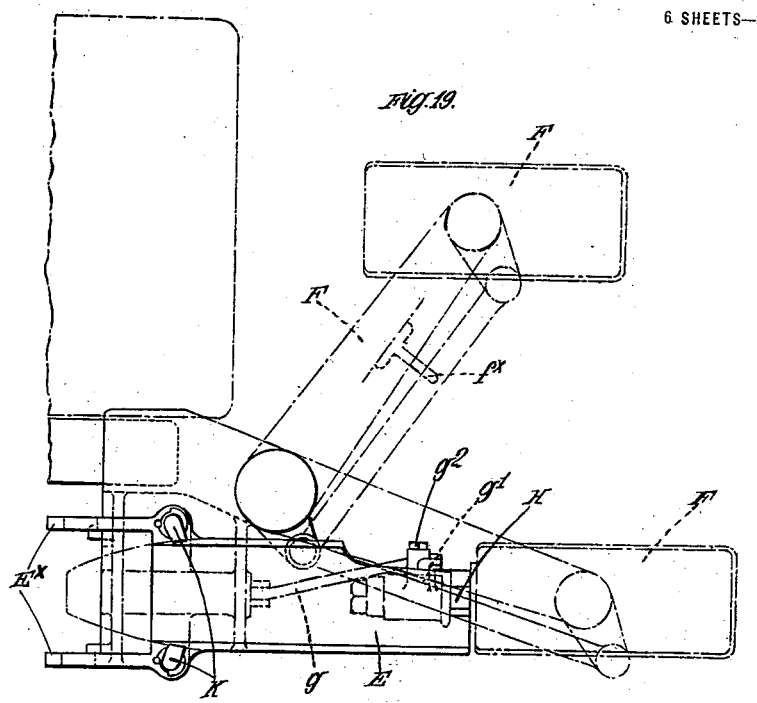
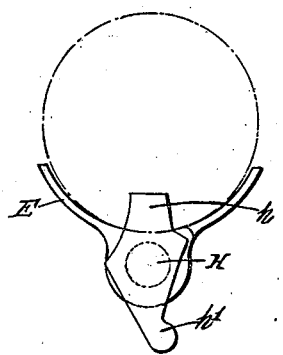
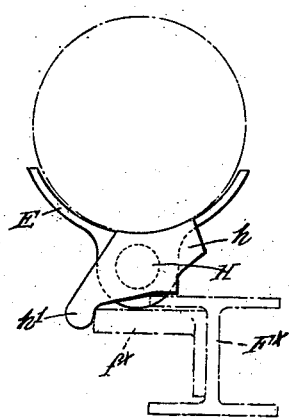

UNITED STATES PATENT OFFICE.

ARTHUR TREVOR DAWSON AND GEORGE THOMAS BUCKHAM, OF WESTMINSTER, LONDON, ENGLAND, ASSIGNORS TO VICKERS LIMITED, OF WESTMINSTER, LONDON, ENGLAND.

GUN-MOUNTING.

1,371,738.     Specification of Letters Patent.     Patented Mar. 15, 1921.

Application filed July 23, 1920. Serial No. 398,567.

*To all whom it may concern:*

Be it known that we, Sir ARTHUR TREVOR DAWSON, bart., and Sir GEORGE THOMAS BUCKHAM, knight, both subjects of the King of Great Britain, residing at Vickers House, Broadway, Westminster, in the county of London, England, have invented certain new and useful Improvements in or Relating to Gun-Mountings, of which the following is a specification.

This invention relates to naval or garrison mountings for guns of medium or comparatively small caliber, as distinct from mountings of the turret type, and has for its chief object to provide improved means for conveying projectiles to the loading tray at the breech end of the gun, this loading tray being preferably of the well-known type which is pivoted to the gun cradle and normally occupies a position to one side of the gun to permit the latter to recoil, the tray being swung into a position behind the gun for loading.

According to the present invention there is provided beneath the gun platform, a stationary chamber or trunk for the reception of the lower part of a rearwardly inclined or curved casing or guide which is attached to a training part of the gun mounting and receives a tray by which the projectiles are lifted from the said chamber to the gun. Means, such as a cam track or guide engaging with a roller on the tray, may be provided for automatically displacing the lifting tray, as it is completing its upward movement about a transverse axis into a position in which the projectile thereon can slide from the said tray on to a waiting tray which, in one constructional form, is attached to a training and nonelevating part of the mounting, the projectile in this case being, when required, lifted from this waiting tray and placed upon the aforesaid swinging tray pivoted to the gun cradle. This constructional form gives a fixed waiting position for the projectile and necessitates the lifting of the projectile from the waiting tray to the swinging tray through a distance dependent upon the angle of elevation of the gun, but in an alternative constructional form we provide for bringing the projectile on to the swinging tray at whatever angle of elevation the gun may be pointing without its being necessary to lift the projectile by hand from the lifting tray. With this object in view we provide an abutment on the gun cradle for part of the lifting tray and we so construct this tray that, when it comes against the said abutment during the raising of the tray, the latter will be swung about a transverse axis into a position in which the projectile thereon can be displaced endwise on to a waiting tray mounted on the cradle. The said abutment is preferably constituted by the forward end of this waiting tray which serves as an intermediate platform or bridge piece between the lifting tray and the aforesaid swinging tray on the cradle. This arrangement enables the projectile to slide automatically from the lifting tray on to the waiting tray, and thence to the aforesaid swinging tray, when the gun is at elevation.

We may employ a stop device which is so constructed and arranged that it will prevent a projectile from being delivered to the waiting tray from the lifting tray when another projectile is on the waiting tray or (in the aforesaid alternative construction) is on the swinging tray with the latter opposite the waiting tray; in the latter case the said stop device is automatically displaced to its inoperative position when the swinging tray moves away from the waiting tray. In conjunction with the said alternative construction a second stop device may be arranged on the waiting tray to prevent the projectile from passing out of it in a rearward direction in the event of the swinging tray not being opposite the waiting tray, this stop device being automatically moved to its inoperative position when the swinging tray comes opposite the waiting tray, so as to enable the projectile to then pass freely into the swinging tray. We may furthermore provide on each side of the waiting tray a spring controlled safety pawl adapted to engage with the forward portion of the projectile, these pawls permitting the projectile to slide base first on to and from the tray but preventing the projectile from sliding out nose first in the event of the ship that carries the mounting rolling to such an extent as would cause such movement of the projectile to occur.

In order that the said invention may be clearly understood and readily carried into effect, we will now describe the same more fully with reference to the accompanying drawings, in which:—

Figure 1 is a sectional side elevation of a gun mounting provided with the first-mentioned of the aforesaid constructional forms of the invention, Fig. 2 is a part plan of Fig. 1, Fig. 2ª is a rear elevation of the lower part of Fig. 1, Figs. 3 and 4 are sections taken approximately on the lines 3, 3 and 4, 4 of Fig. 1 and drawn to an enlarged scale, Fig. 5 is a section taken approximately on the line 5, 5 of Fig. 1 and drawn to a larger scale than Figs. 3 and 4.

Fig. 6 is a rear elevation of the waiting tray of Fig. 1, drawn to an enlarged scale, and Fig. 7 is a section taken approximately on the line 7, 7 of Fig. 1.

Fig. 8 is a sectional side elevation showing a constructional form of the aforesaid stop device on the waiting tray of Fig. 1, Figs. 9, 10 and 11 are respectively a side elevation, a plan and an end elevation viewed from the left showing details of the lifting tray of Fig. 1, Fig. 12 is a view similar to Fig. 1 but with the casing in section showing the second-mentioned of the aforesaid constructional forms of the invention, Fig. 12ª is a section taken approximately on the line 12, 12 of Fig. 12, Fig. 13 is a part plan of Fig. 12.

Figs. 14 and 15 are sections taken approximately on the lines 14, 14 and 15, 15 of Fig. 12 and drawn to an enlarged scale.

Fig. 16 is a sectional side elevation showing the aforesaid stop devices and safety pawls employed in conjunction with the constructional form of the invention shown by Figs. 12 to 15, the stop devices being in the position they occupy to enable a projectile to pass from the lifting tray to the waiting tray and thence to the swinging tray.

Fig. 17 is a view similar to Fig. 16 (but with all the parts shown in elevation) showing how the first-mentioned of the aforesaid stop devices prevents a projectile from being delivered to the waiting tray when another projectile is on the swinging tray and the latter occupies a position opposite the waiting tray.

Fig. 18, is a side elevation showing how the second-mentioned of the aforesaid stop devices prevents a projectile that enters the waiting tray from falling out when the swinging tray is not opposite the waiting tray.

Fig. 19 is a plan of Fig. 18, and Figs. 20 and 21 are rear elevations of the waiting tray showing the second-mentioned stop device in its inoperative position corresponding to the position of the parts in Figs. 16 and 17, and in its operative position corresponding to the position of the parts in Figs. 18 and 19.

A is the aforesaid stationary chamber or trunk having at its upper end a ring $A'$ upon which the gun carriage $A^0$ is rotatably mounted for training and which is connected to a training rack in the form of a ring $A^2$ having internal teeth. B is the aforesaid casing or guide attached to the gun carriage at one side thereof and arranged with its lower end near the axis of the chamber A and with its upper end situated some distance to the rear of the said axis, and C is the projectile lifting tray disposed in the said casing. This casing may be of rectangular or circular cross section (in the construction shown it is rectangular) and its lower part has an opening or openings through which projectiles can be placed upon the lifting tray by a number who stands upon a platform D which may be suitably attached to a training part of the gun mounting as shown by Fig. 1 or may be rigidly secured to a part of the ship's structure. The said casing is disposed within the toothed training ring $A^2$ and the tray C can be raised by one or more cables $C^x$ and one or more winch drums $C^2$ operated by a crank handle $C^{2x}$ and arranged at the upper end of the casing, the weight of the projectile and tray being balanced or partly banlanced by a suitable counterweight $C^3$ connected to a rope $C^{3x}$ wound upon a drum $C^4$ which in Figs. 1, 2 and 2ª is connected to a drum $C^8$ upon which is wound the free end of the cable $C^x$ appertaining to the inner one of the two winch drums $C^2$ at the upper end of the casing, the portion of the cable between the drum $C^2$ and the drum $C^8$ passing by the side of the casing B as is shown in Fig. 2ª; in Figs. 12 and 13 the drum $C^4$ is driven directly by the crank handle $C^{2x}$.

In Figs. 1 and 3 an auxiliary or alternative crank handle $C^{2xx}$ is provided at the lower part of the casing, this crank handle operating upon the drums $C^4$, $C^0$ and $C^8$. The wall of the chamber or trunk A is formed with a number of openings through which the projectiles may conveniently be passed to, or placed within the reach of the number who inserts them into the lifting tray, thereby providing a convenient arrangement for the passage of the projectile at all angles of training of the gun. E is the aforesaid waiting tray on to which the projectiles are deposited from the lifting tray C and which in Figs. 1 and 2 is attached to the gun mounting and in Figs. 12 and 13 is attached to the gun cradle. F is the aforesaid swinging tray to which the projectiles are transferred from the waiting tray and which is pivotally carried by the gun cradle as is well understood.

In the construction shown by Figs. 1 to 11, the lifting tray C is provided with two pairs of rollers C⁷, C⁷, and C⁵, C⁵ and the casing B is formed with two pairs of guides B′, B′ and B², B² in which the said rollers engage. The guides B′, B′ are straight throughout their whole length but the guides B², B² are straight through only a portion of their length, the upper portions being curved as shown by Fig. 1 to form cam tracks for the rollers C⁵, C⁵ so as to cause the lifting tray C to be tilted about the axis of the rollers C⁷, C⁷ into the position shown by chain lines at the upper part of Fig. 1 to cause the projectile to slide base foremost on to the waiting tray E. As shown by Figs. 9, 10 and 11 the trunnions carrying the rollers C⁷, C⁷ have loosely mounted on them a stirrup piece C⁶ to the upper ends of which the cables Cˣ, Cˣ are connected and to the lower end of which a cable Cˣˣ leading to a drum C⁰ (Figs. 1 and 3) is connected. The waiting tray E has a stop-piece e to prevent the projectile from sliding off the tray and is formed with a gap e′ to enable the loading number to place his hand beneath the projectile in order to lift it from the waiting tray and place it on the swinging tray F. The said waiting tray is also provided with a stop device G (see Fig. 8) in the form of a bolt connected to a bell crank lever G⁰ whose rear arm is adapted to project above the surface of the tray so that when a projectile passes on to the tray the said lever will be operated thereby to cause the bolt to project above the surface of the tray and so prevent a projectile from being delivered to the tray from the lifting tray so long as the projectile remains on the waiting tray. When the latter projectile is removed the bolt G is returned to its inoperative position by a handle Gˣ on the lever G⁰.

In the construction shown by Figs. 12 to 15 the casing B is curved instead of being straight and the waiting tray E instead of being on the mounting is on the cradle. The lifting tray has two sets of rollers C⁷, C⁷ and C⁵, C⁵ of which the latter engage in guides B², B² constituted by two sets of angle irons b, b, and b′, b′; the rollers C⁷, C⁷ bear upon the front surfaces of the angle irons b, b. The waiting tray E is formed with two forward extensions Eˣ, Eˣ having curved recesses eˣ, eˣ in their under surfaces and the cable Cˣ is connected to the lifting tray in such a manner that when the rollers C⁵, C⁵ come into contact with the recesses eˣ, eˣ during the last part of the upward movement of the lifting tray, a continued pull on the cable cˣ will cause the lifting tray to be rocked about the axis of the rollers C⁵, C⁵ into a position in line with the waiting tray E, this position being determined by the engagement of the rear end of the lifting tray in a recess E⁰ in the forward end of the waiting tray E. During the rocking of the lifting tray the rollers C⁷, C⁷ are moved out of contact with the angle irons b, b. It will be observed that the waiting tray E constitutes a bridge piece between the lifting tray C and the swinging tray F so that if the gun is at elevation the projectile will slide automatically on to the latter tray when the lifting tray is rocked as stated above; when the gun is pointing horizontally or is at only very small angles of elevation the projectile will have to be displaced axially by hand from the lifting tray to the swinging tray.

Referring to Figs. 16 to 21, G is the stop device for preventing a projectile from being delivered from the lifting tray C to the waiting tray E when another projectile is on the waiting tray or is on the swinging tray F with the latter opposite the waiting tray, H is the stop device for preventing a projectile from passing out of the waiting tray in a rearward direction when the swinging tray is not opposite the waiting tray and K, K are the safety pawls for preventing a projectile on the waiting tray from sliding out nose first during the rolling of the ship.

The stop device G is in the form of a spring controlled bolt mounted to slide longitudinally in the lower part of the waiting tray and adapted to be protruded, against the resistance of the spring G′, so that the protruding portion can assume the position shown by Fig. 17 to prevent the lifting tray from reaching the position in which the said lifting tray is automatically displaced to cause or permit the projectile to be transferred to the waiting tray. The said bolt is connected by a rod g to a lever g′ pivoted at g² on the waiting tray and so arranged that when a projectile passes on to the swinging tray (or on to the waiting tray when the swinging tray is not in its receiving position opposite the waiting tray), the lever will be displaced by the projectile into a position to protrude the bolt as aforesaid into the path of the lifting tray, the said lever occupying this position so long as the projectile bears against it, that is to say so long as the swinging tray occupies its position behind the waiting tray (Fig. 17) or so long as the projectile remains on the waiting tray (Fig. 18). When the swinging tray is moved away from the waiting tray E, the projectile is removed from contact with the lever g′ and the bolt G is withdrawn by its spring out of the path of the lifting tray so that the raising of the lifting tray can be completed to cause a projectile to be transferred to the waiting tray as aforesaid and thence to the swinging tray F when the latter comes opposite the waiting tray.

The aforesaid stop device H takes the form of a pivoted lever which is controlled by a torsion spring H× and has one arm $h$ adapted to project above the surface of the waiting tray E at the rear end thereof and another arm $h'$ adapted to be operated upon by a part $f^\times$ on the pivoted arm F× of the swinging tray F when the latter comes opposite the waiting tray, to displace the lever H against the resistance of its spring H× into a position in which the first-mentioned arm $h$ is in the position to allow a projectile to pass from the waiting tray to the swinging tray.

The aforesaid spring controlled safety pawls K, K arranged one on each side of the waiting tray E are adapted to engage with the forward part of the projectile a short distance in front of the position where the ogival head merges into the cylindrical portion of the projectile; the said pawls are free to be displaced against the resistance of their springs as the projectile enters the tray base first, but grip the projectile in the event of its tending to slide from the tray nose first as aforesaid.

What we claim and desire to secure by Letters Patent of the United States is:—

1. In a gun mounting, the combination with the gun platform, of a stationary chamber arranged beneath said platform, a guide member which is attached to a training part of the mounting and is disposed in said chamber, a projectile lifting tray movably mounted on said guide member for carrying projectiles endwise upwardly toward the gun breech, means for raising and lowering said tray, a waiting tray and means for automatically causing said lifting tray, as it is completing its upward movement, to be displaced into a nearly horizontal position in which the projectile thereon can slide on to said waiting tray.

2. In a gun mounting, the combination with the gun platform, of a stationary chamber arranged beneath said platform, a guide member which is attached to a training part of the mounting and is disposed in said chamber, a projectile lifting tray movably mounted on said guide member for carrying projectiles endwise upwardly toward the gun breech, means for raising and lowering said tray, a waiting tray, and means for automatically causing said lifting tray, as it is completing its upward movement to be swung about a horizontal axis into a nearly horizontal position in which the projectile thereon can slide on to said waiting tray.

3. In a gun mounting, the combination with the gun platform, of a stationary chamber arranged beneath said platform, a guide member which is attached to a training part of the mounting and is disposed in said chamber, a projectile lifting tray movably mounted on said guide member, means for raising and lowering said tray, a waiting tray, means for automatically causing said lifting tray, as it is completing its upward movements, to be displaced into a position in which the projection in which the projectile thereon can slide on to said waiting tray, and a stop device for preventing a projectile from being delivered to the waiting tray from the lifting tray when another projectile is on the waiting tray.

4. In a gun mounting, the combination with the gun platform, of a stationary chamber arranged beneath said platform, a guide member which is attached to a training part of the mounting and is disposed in said chamber, a projectile lifting tray movably mounted on said guide member, means for raising and lowering said tray, a waiting tray, means for automatically causing said lifting tray, as it is completing its upward movement, to be displaced about a transverse axis into a position in which the projectile thereon can slide on to said waiting tray and a stop device for preventing said lifting tray from being so displaced when another projectile is on the waiting tray.

5. In a gun mounting, the combination with the gun cradle, a lifting tray for raising projectiles to a position contiguous to the breech end of the gun and means for raising and lowering said tray, of a waiting tray on the gun cradle, a swinging tray on the gun cradle, and means for automatically causing said lifting tray, as it is completing its upward movement, to be displaced into a position such that the projectile thereon can pass on to the waiting tray and thence to the swinging tray.

6. In a gun mounting, the combination with the gun cradle and the gun platform, of a stationary chamber arranged beneath said platform, a guide member which is attached to a training part of the mounting and is disposed in said chamber, a tray movably mounted on said guide member for lifting projectiles from said chamber to the gun, means for raising and lowering said tray, a waiting tray on the gun cradle, a swinging tray on the gun cradle, and means for automatically causing said lifting tray, as it is completing its upward movement, to be displaced into a position such that the projectile thereon can pass on to the waiting tray and thence to the swinging tray.

7. In a gun mounting, the combination with the gun cradle, a lifting tray for raising projectiles to a position contiguous to the breech end of the gun and means for raising and lowering said tray, of a waiting tray on the gun cradle, a swinging tray on the gun cradle, means for automatically causing said lifting tray, as it is completing its upward movement, to be displaced into a position such that the projectile thereon can pass on to the waiting tray and thence to the swinging tray, a stop device for preventing a projectile from being delivered to the waiting tray from the lifting tray when another projectile is on the waiting tray or is on the swinging tray with the latter opposite the waiting tray and means whereby said device is automatically displaced to its inoperative position when the swinging tray, with the projectile thereon, moves away from the waiting tray.

8. In a gun mounting, the combination with the gun cradle and the gun platform, of a stationary chamber arranged beneath said platform, a guide member which is attached to a training part of the mounting and is disposed in said chamber, a tray movably mounted on said guide member for lifting projectiles from said chamber to the gun, means for raising and lowering said tray, a waiting tray on the gun cradle, a swinging tray on the gun cradle, means for automatically causing said lifting tray, as it is completing its upward movement, to be displaced into a position such that the projectile thereon can pass on to the waiting tray and thence to the swinging tray, a stop device for preventing a projectile from being delivered to the waiting tray from the lifting tray when another projectile is on the waiting tray or is on the swinging tray with the latter opposite the waiting tray and means whereby said device is automatically displaced to its inoperative position when the swinging tray, with the projectile thereon, moves away from the waiting tray.

9. In a gun mounting, the combination with the gun cradle, a lifting tray for raising projectiles to a position contiguous to the breech end of the gun and means for raising and lowering said tray, of a waiting tray on the gun cradle, a swinging tray on the gun cradle, means for automatically causing said lifting tray as it is completing its upward movement, to be displaced into a position such that the projectile thereon can pass on to the waiting tray and thence to the swinging tray, a stop device on the waiting tray for preventing the projectile thereon from passing out of it in a rearward direction in the event of the swinging tray not being opposite the waiting tray and means whereby said stop device is automatically moved into its operative position when the swinging tray comes opposite the waiting tray.

10. In a gun mounting, the combination with the gun cradle and the gun platform, of a stationary chamber arranged beneath said platform, a guide member which is attached to a training part of the mounting and is disposed in said chamber, a tray movably mounted on said guide member for lifting projectiles from said chamber to the gun, means for raising and lowering said tray, a waiting tray on the gun cradle, a swinging tray on the gun cradle, means for automatically causing said lifting tray, as it is completing its upward movement, to be displaced into a position such that the projectile thereon can pass on to the waiting tray and thence to the swinging tray, a stop device on the waiting tray for preventing the projectile thereon from passing out of it in a rearward direction in the event of the swinging tray not being opposite the waiting tray and means whereby said stop device is automatically moved into its inoperative position when the swinging tray comes opposite the waiting tray.

11. In a gun mounting, the combination with the gun cradle, a lifting tray for raising projectiles to a position contiguous to the breech end of the gun, and means for raising and lowering said tray, of a waiting tray on the gun cradle, a swinging tray on the gun cradle, means for automatically causing said lifting tray, as it is completing its upward movement, to be displaced into a position such that the projectile thereon can pass on to the waiting tray and thence to the swinging tray, a device for preventing a projectile from being delivered to the waiting tray from the lifting tray when another projectile is on the waiting tray or is on the swinging tray with the latter opposite the waiting tray, means whereby said device is automatically displaced to its inoperative position when the swinging tray, with the projectile thereon, moves away from the waiting tray, a stop device on the waiting tray for preventing the projectile thereon from passing out of it in a rearward direction in the event of the swinging tray not being opposite the waiting tray and means whereby said stop device is automatically moved into its inoperative position when the swinging tray comes opposite the waiting tray.

12. In a gun mounting, the combination with the gun platform, of a stationary chamber arranged beneath said platform, a guide member which is attached to a training part of the mounting and is disposed in said chamber, a tray movably mounted on said guide member for lifting projectiles from said chamber to the gun, means for raising and lowering said tray, a waiting tray on the gun cradle, a swinging tray on the gun cradle, means for automatically causing said lifting tray, as it is completing its upward movement, to be displaced into a position such that the projectile thereon can pass on to the waiting tray and thence to the swinging tray, a device for preventing a projectile from being delivered to the waiting tray from the lifting tray, when another projectile is on the waiting tray or is on the swinging tray with the latter opposite the waiting tray, means whereby said device is automatically displaced to its inoperative position when the swinging tray with the projectile thereon moves away from the waiting tray, a stop device on the waiting tray for preventing the projectile thereon from passing out of it in a rearward direction in the event of the swinging tray not being opposite the waiting tray and means whereby said stop device is automatically moved into its inoperative position when the swinging tray comes opposite the waiting tray.

13. In a ship's gun mounting, the combination with a projectile waiting tray, of a safety device which is continuously in contact with the projectile in the tray and which permits the free movement of the projectile base first on to and from said tray but which automatically coöperates with the projectile to prevent the latter from moving out nose first in the event of the ship rolling to such an extent as to cause such movement.

14. In a ship's gun mounting, the combination with a projectile waiting tray, of spring controlled pawls adapted to engage under the action of the springs which press the pawls into contact with the forward portion of the projectile, these pawls permitting the projectile to slide base first on to and from said tray but automatically preventing the projectile from moving out nose first in the event of the ship rolling to such an extent as to cause such movement.

15. In a gun mounting, the combination with the gun platform, of a stationary chamber arranged beneath said platform, a guide member which is attached to a training part of the mounting and is disposed in said chamber, a projectile lifting tray movably mounted on said guide member, means for raising and lowering said tray, a waiting tray, means for automatically causing said lifting tray, as it is completing its upward movement, to be displaced into a position in which the projectile thereon can slide on to said waiting tray and a safety device which permits the free movement of the projectile base first on to and from said waiting tray but which coöperates with the projectile to prevent the latter from moving nose first out of said waiting tray in the event of the ship rolling to such an extent as to cause such movement.

16. In a gun mounting, the combination with the gun cradle, a lifting tray for raising projectiles to a position contiguous to the breech end of the gun, and means for raising and lowering said tray, of a waiting tray on the gun cradle, a swinging tray on the gun cradle, means for automatically causing said lifting tray, as it is completing its upward movement, to be displaced into a position such that the projectile thereon can pass on to the waiting tray and thence to the swinging tray and a safety device which permits the free movement of the projectile base first on to and from said waiting tray but which coöperates with the projectile to prevent the latter from moving nose first out of said waiting tray in the event of the ship rolling to such an extent as to cause such movement.

17. In a gun mounting, the combination with the gun platform, of a stationary chamber arranged beneath said platform, a guide member which is attached to a training part of the mounting and is disposed in said chamber, a tray movably mounted on said guide member for lifting projectiles from said chamber to the gun, means for raising and lowering said tray, a waiting tray on the gun cradle, a swinging tray on the gun cradle, means for automatically causing said lifting tray, as it is completing its upward movement, to be displaced into a position such that the projectile thereon can pass on to the waiting tray and thence to the swinging tray, a device for preventing a projectile from being delivered to the waiting tray from the lifting tray when another projectile is on the waiting tray or is on the swinging tray with the latter opposite the waiting tray, means whereby said device is automatically displaced to its inoperative position when the swinging tray, with the projectile thereon, moves away from the waiting tray, a stop device on the waiting tray for preventing the projectile thereon from passing out of it in a rearward direction in the event of the swinging tray not being opposite the waiting tray, means whereby said stop device is automatically moved into its inoperative position when the swinging tray comes opposite the waiting tray and a safety device which permits the free movement of the projectile base first on to and from said waiting tray but which coöperates with the projectile to prevent the latter from moving nose first out of said waiting tray in the event of the ship rolling to such an extent as to cause such movement.

In testimony whereof we affix our signatures.

ARTHUR TREVOR DAWSON.
GEORGE THOMAS BUCKHAM.